United States Patent
Tsuruhara

(10) Patent No.: US 6,218,747 B1
(45) Date of Patent: Apr. 17, 2001

(54) CAR AC GENERATOR

(75) Inventor: Kenji Tsuruhara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/388,369

(22) Filed: Sep. 1, 1999

(30) Foreign Application Priority Data

Mar. 9, 1999 (JP) .................................................. 11-061592

(51) Int. Cl.$^7$ ....................................................... H02K 9/19
(52) U.S. Cl. ................................................. 310/54; 310/52
(58) Field of Search .............................. 310/52, 54, 58, 310/59, 60 R, 62, 64, 89; 29/596–598

(56) References Cited

U.S. PATENT DOCUMENTS

| | | | |
|---|---|---|---|
| 3,363,123 | * | 1/1968 | Jaeschke .................................. 310/54 |
| 4,250,423 | * | 2/1981 | Linscott, Jr. .......................... 310/258 |
| 4,739,204 | | 4/1988 | Kitamura et al. .................... 318/68 D |
| 4,870,307 | * | 9/1989 | Kitamura et al. ....................... 310/54 |
| 4,980,588 | * | 12/1990 | Ogawa . |
| 5,293,089 | * | 3/1994 | Frister ...................................... 310/54 |
| 5,705,865 | * | 1/1998 | Ishida et al. ............................ 310/62 |
| 5,708,318 | * | 1/1998 | Fudono .................................. 310/263 |
| 5,744,880 | * | 4/1998 | Kudoh et al. ........................... 310/58 |
| 5,747,905 | * | 5/1998 | Yabushita et al. ...................... 310/89 |
| 5,796,201 | * | 8/1998 | Kamitani et al. ..................... 310/194 |
| 5,825,116 | * | 10/1998 | Ishikawa ............................... 310/263 |
| 5,836,270 | * | 11/1998 | Aoki et al. ......................... 123/41.31 |

FOREIGN PATENT DOCUMENTS

| | | |
|---|---|---|
| 4-67429 | 10/1992 | (JP) . |
| 4-67430 | 10/1992 | (JP) . |

* cited by examiner

*Primary Examiner*—Tran Nguyen
(74) *Attorney, Agent, or Firm*—Sughrue, Mion, Zinn, Macpeak & Seas, PLLC

(57) ABSTRACT

A car AC generator which is capable of simplifying the structures of cooling function portions with a cooling liquid and cooling air.

At least one of a front bracket and a rear bracket has a ring-shaped cooling recessed portion in a peripheral portion, the front bracket and the rear bracket are combined together to form a part chamber for storing power generation parts consisting of a generator shaft, a stator and a rotor, the cooling recessed portion forms a ring-shaped peripheral cooling chamber, a cooling cover is placed upon a rear portion of the rear bracket to form a rear cooling chamber with the rear bracket, the rear bracket has a communication hole for connecting the peripheral cooling chamber to the rear cooling chamber, at least one of the front bracket and the rear bracket has air holes communicating with the part chamber and the outside, and a power generation part has a fan.

16 Claims, 3 Drawing Sheets

CAR AC GENERATOR

BACKGROUND OF THE INVENTION

1. Field of the Invention

The present invention relates to a car AC generator having a cooling function with a cooling liquid and cooling air.

2. Description of the Prior Art

FIG. 3 is a sectional view of a brushless car AC generator disclosed by Japanese Patent No. 4-68850. In FIG. 3, reference numeral 101 denotes a generator case. A bowl-like front bracket 102, a bowl-like rear bracket 103 and a cylindrical enclosing member 104 are combined together to form an inner part chamber 105 and an outer first cooling chamber 106. Denoted by 107 is a sealing member such as an O ring fitted in an interface portion between the front bracket 102 and the rear bracket 103, 108 a gasket fitted in an interface portion between the front bracket 102 and the enclosing member 104, 109 a gasket fitted in an interface portion between the rear bracket 103 and the enclosing member 104, and 110 an inflow port formed in the rear bracket 103. Reference numeral 111 represents a cylindrical stator which comprises a stator magnetic pole 112 and a stator coil 113 and is installed in the enclosing member 104, and 114 is a generator shaft which is rotably placed in a center portion of the front bracket 102 and a center portion of the rear bracket 103 by a front bearing 115 and a rear bearing 116. Denoted by 117 is a pulley which is fitted onto the generator shaft 114 projecting forward from the front bracket 102 so that it can turn together with the shaft 114, 118 a rotary magnetic pole which comprises a first rotary magnetic pole 119 fitted onto the generator shaft 114 so that it can turn together with the shaft 114 and a second rotary magnetic pole 121 fixed to a peripheral portion of the first rotary magnetic pole 119 through a support ring 120 in the part chamber 105. Reference numeral 122 denotes an exciter which comprises an excitation pole 123 fixed to the rear bracket 103 and an excitation coil 124 attached to the excitation pole 123 and which is stored in a cylindrical container portion 125 formed in the rotary magnetic pole 118. An air gap is existent between the stator 111 and the rotary magnetic pole 118 and between the rotary magnetic pole 118 and the excitation pole 122. Denoted by 126 is a heat conductor, extending through the rear bracket 103, for radiating the heat of the exciter 122, 127 a sealing agent charged into a portion where the heat conductor 126 extends through the rear bracket 103, 128 a plate-like cooling cover which is placed upon the rear bracket 103 to form a second cooling chamber 129 between it and the rear surface of the rear bracket 103, 130 a connection passage formed in the rear bracket 103 which connects the first cooling chamber 106 and the second cooling chamber 129, 131 a gasket fitted in an interface portion between the rear bracket 103 and the cooling cover 128, 132 a voltage regulator installed on the rear surface of the cooling cover 128, 133 a voltage regulator terminal, 134 a rectifier installed on the rear surface of the cooling cover 128, 135 a rectifier terminal, 136 a stator terminal connected to the rectifier terminal 135 and projecting from the enclosing member 104, 137 an external terminal provided in the vicinity of the rectifier 134, 138 a connector for the external terminal 137 connected to the voltage regulator terminal 135, 140 a protective cover attached to the rear bracket 103 to cover the cooling cover 128, the voltage regulator 132, the voltage regulator terminal 133, the rectifier 134, the rectifier terminal 135, the stator terminal 136 and the connector 138, 141 a hole formed in the protective cover 140 for the external terminal 137 to project from the protective cover 140, and 142 a cooling liquid.

A description is first given of the power generation operation of the AC generator of the prior art when it is used in an automobile. The AC generator is installed outside the cylinder block of an engine, a ring-shaped belt is laid between a pulley provided on the crank shaft of the engine and the pulley 117 of the AC generator, and the external terminal 137 is wired to the battery of the automobile. When a driver turns on the ignition switch of the automobile in this state, a current runs from the battery of the automobile to an ignition coil to start the engine, an excitation current runs from the battery to the excitation coil 124 through the voltage regulator 132 at the same time, and the stator magnetic pole 112, the rotary magnetic pole 118 and the excitation pole 123 form a magnetic circuit. When the generator shaft 114 turns by the start of the engine and the rotary magnetic pole 118 turns, the first rotary magnetic pole 119 and the second rotary magnetic pole 121 pass by the stator magnetic pole 112 alternately, whereby an alternating magnetic flux runs through the stator coil 113 and 3-phase alternating induced electromotive force is generated in the stator coil 113. This induced electromotive force is adjusted by the voltage regulator 132, rectified by the rectifier 134 and charged into the battery from the external terminal 137 through an unshown wire.

A description is subsequently given of the cooling operation of the AC generator of the prior art when it is used in the automobile. The AC generator is attached to the engine, the inflow port 110 and an unshown outflow port are connected to an engine cooling system by an unshown pipe, the AC generator generates power by the start of the engine, and the water pump of the engine cooling system is driven to circulate the cooling liquid. In this state, the cooling liquid 142 shown by dotted lines flows from the inflow port 110 to the first cooling chamber 106, the connection passage 130 and the second cooling chamber 129 as shown by an arrow X3. In the first cooling chamber 106 and the second cooling chamber 129, heat generated from such parts as the stator 111, the exciter 122, the voltage regulator 132 and the rectifier 134 by the operation of power generation is absorbed by the cooling liquid 142 through heat exchange with the cooling liquid 142. The cooling liquid 142 which has absorbed the heat returns to the engine cooling system from the outflow port (a structure similar to this cooling system is disclosed by FIG. 12 of Japanese Laid-open Patent Application No. 8-130854).

SUMMARY OF THE INVENTION

Since the car AC generator of the prior art is constituted as described above, the first cooling chamber 106 is formed apart from the part chamber 105 by three separate parts, the front bracket 102, the rear bracket 103 and the cylindrical enclosing member 104, and the second cooling chamber 129 is formed outside the generator case 101 by two separate parts, the rear bracket 103 and the cooling cover 128. Therefore, the structures of portions having a cooling function with the cooling liquid 142 are complex.

It is therefore an object of the present invention to provide a car AC generator which is capable of simplifying the structures of cooling function portions with a cooling liquid and cooling air.

According to a first aspect of the present invention, there is provided a car AC generator having a cooling function with a cooling liquid and cooling air, wherein at least one of a front bracket and a rear bracket has a ring-shaped cooling recessed portion in a peripheral portion, the front bracket and the rear bracket are combined together to form a part chamber for storing power generation parts consisting of a generator shaft, a stator and a rotor, the cooling recessed portion forms a ring-shaped peripheral cooling chamber, a cooling cover is placed upon a rear portion of the rear bracket to form a rear cooling chamber with the rear bracket, the rear bracket has a communication hole for connecting the peripheral cooling chamber to the rear cooling chamber, at least one of the front bracket and the rear bracket has air holes communicating with the part chamber and the outside, and a power generation part has a fan.

According to a second aspect of the present invention, there is provided a car AC generator wherein the ring-shaped cooling recessed portion is formed in both the front bracket and the rear bracket, and interfaces between the front bracket and the rear bracket are situated at a location corresponding to the stator.

According to a third aspect of the present invention, there is provided a car AC generator, wherein the interfaces between the front bracket and the rear bracket are formed as ring-shaped stepped portions.

According to a fourth aspect of the present invention, there is provided a car AC generator, wherein at least one of the rotor and the generator shaft has an air hole.

According to a fifth aspect of the present invention, there is provided a car AC generator, wherein the front bracket, the rear bracket and the cooling cover are made from a material having high heat conductivity.

According to a sixth aspect of the present invention, there is provided a car AC generator, wherein the stator is supported by the brackets forming the part chamber through an electric insulating material having high heat conductivity.

According to a seventh aspect of the present invention, there is provided a car AC generator, wherein the electric insulating material is charged into a gap between the stator and the part chamber and solidified.

According to an eighth aspect of the present invention, there is provided a car AC generator, wherein at least one of the front bracket and the rear bracket has a filling port for charging and solidifying an electric insulating material.

According to a ninth aspect of the present invention, there is provided a car AC generator, wherein a voltage regulator is attached to the part chamber side of the rear bracket through cushions having high heat conductivity.

According to a tenth aspect of the present invention, there is provided a car AC generator, wherein a rectifier is attached to the part chamber side of the rear bracket through cushions having high heat conductivity.

According to an eleventh aspect of the present invention, there is provided a car AC generator, wherein cooling fins are provided on the side surfaces of the cooling chambers of the brackets forming the part chamber.

According to a twelfth aspect of the present invention, there is provided a car AC generator, wherein the cooling fins are formed like rings extending in the circumferential direction of the peripheral cooling chamber.

According to a thirteenth aspect of the present invention, there is provided a car AC generator, wherein the cooling fins are provided at a location corresponding to the rectifier attached to the rear bracket.

According to a fourteenth aspect of the present invention, there is provided a car AC generator, wherein the cooling fins are provided at a location corresponding to the voltage regulator attached to the rear bracket.

According to a fifteenth aspect of the present invention, there is provided a car AC generator, wherein an inflow port for introducing a cooling liquid is formed in the rear cooling chamber and an outflow port for discharging the cooling liquid is formed in the peripheral cooling chamber.

According to a sixteenth aspect of the present invention, there is provided a car AC generator, wherein a cooling system having at least a tank and a radiator is connected to the cooling chambers independently of the engine cooling system of a vehicle.

The above and other objects, features and advantages of the invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENTS

Embodiment 1

Figure 1:
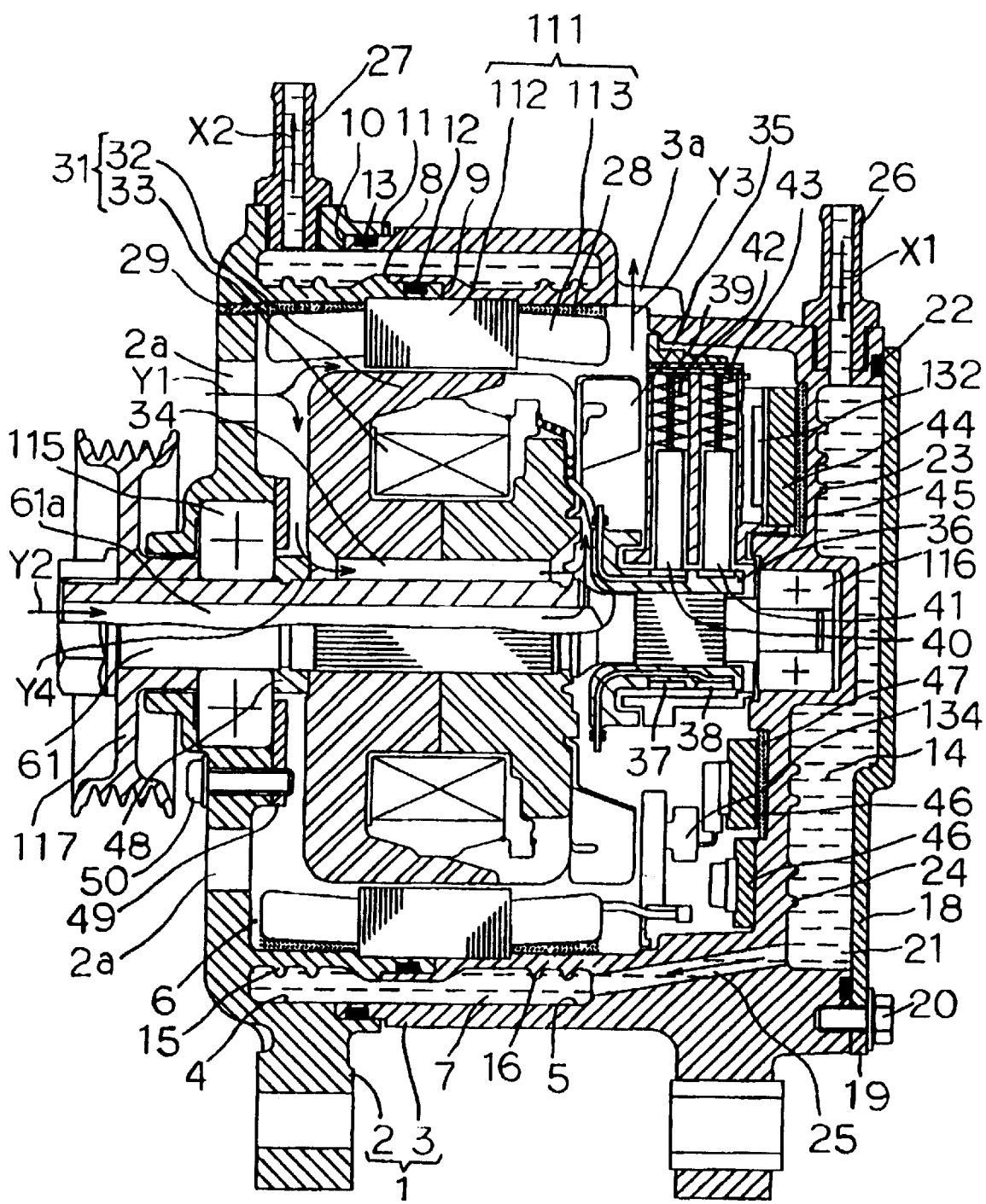
FIG. 1 is a sectional view of an AC generator according to Embodiment 1 of the present invention.
Figure 2:
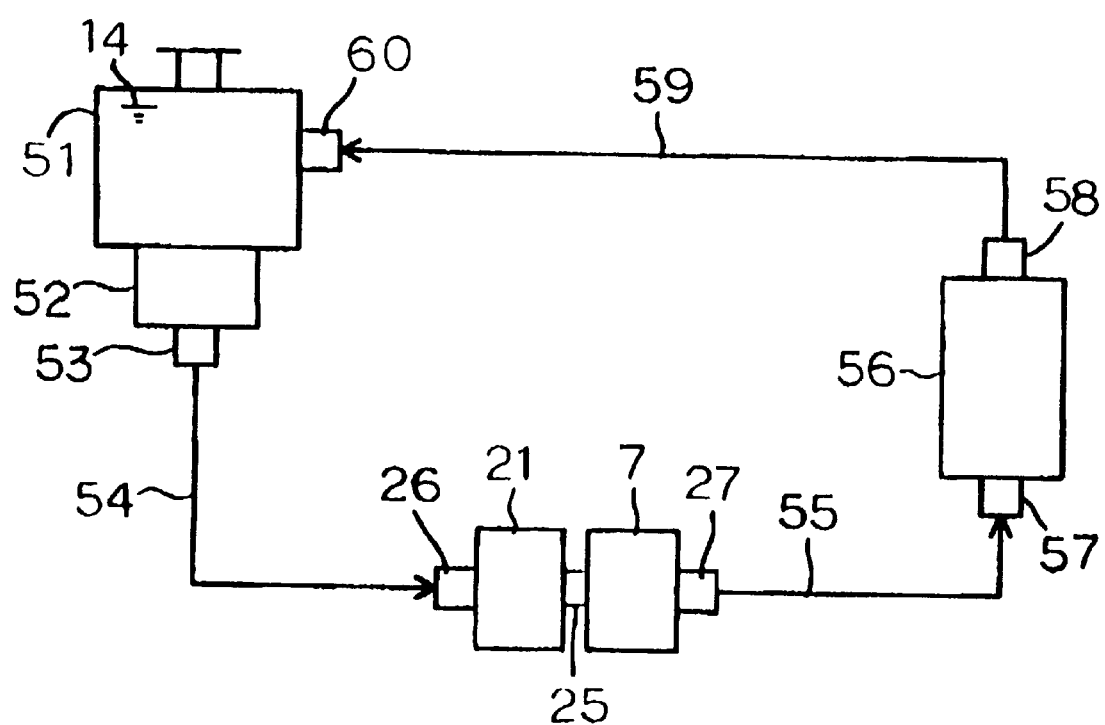
FIG. 2 is a block diagram of a cooling system according to Embodiment 1 of the present invention.
Figure 3:
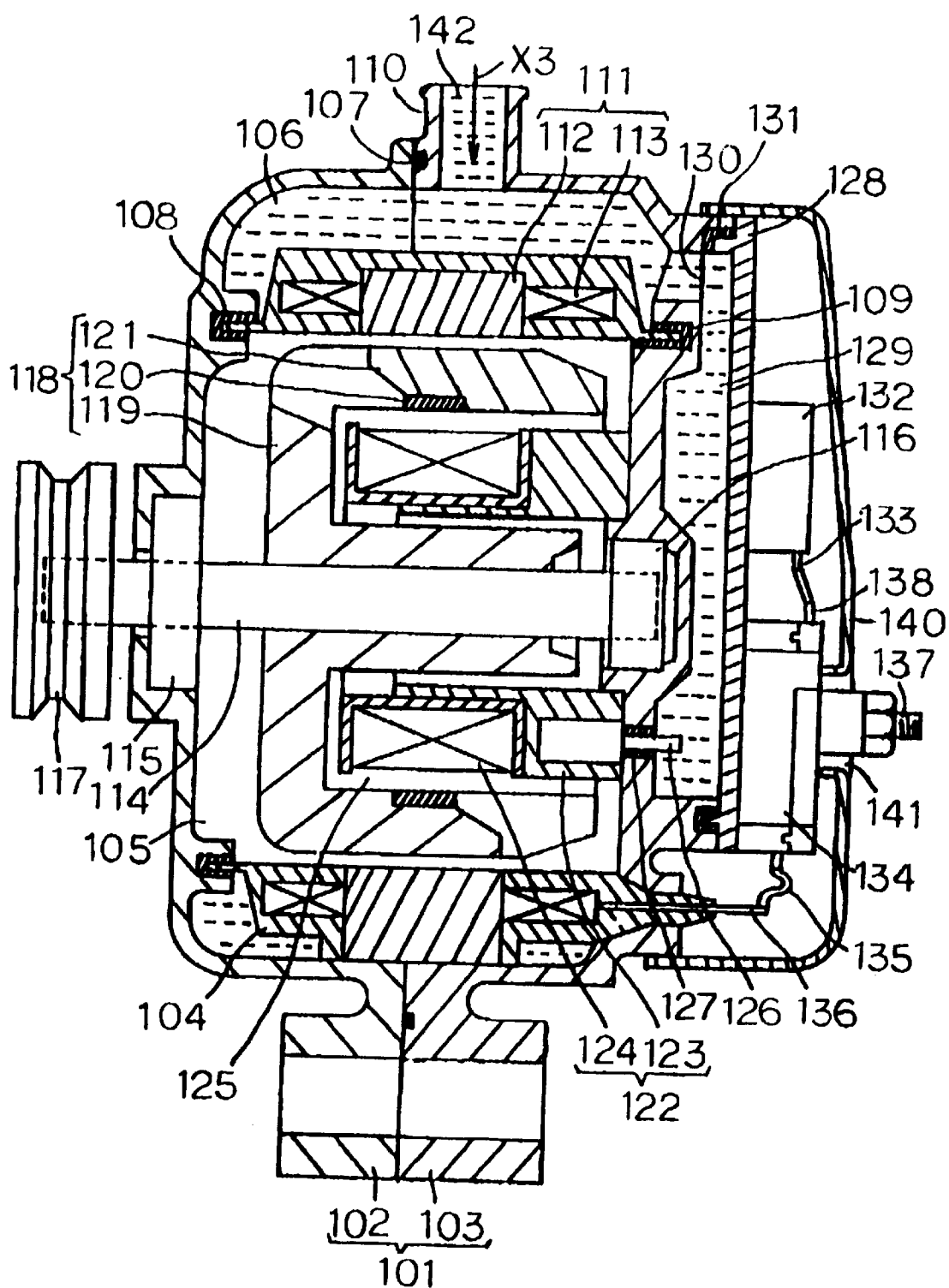
FIG. 3 is a sectional view of an AC generator of the prior art.

FIG. 1 and FIG. 2 show Embodiment 1 of the present invention. FIG. 1 is a sectional view of a car AC generator with a brush and FIG. 2 is a block diagram of a cooling system. In FIG. 1, reference 1 denotes a generator case. A bowl-like front bracket 2 and a bowl-like rear bracket 3 have ring-shaped cooling recessed portions 4 and 5 in the peripheral portions, respectively. The rear side of the cooling recessed portion 4 of the front bracket 2 is open and the front side of the cooling recessed portion 5 of the rear bracket 3 is open. The front bracket 2 and the rear bracket 3 are combined together to form a part chamber 6, and the cooling recessed portions 4 and 5 form an airtight ring-shaped peripheral cooling chamber 7. Interfaces 8, 9, 10 and 11 between the front bracket 2 and the rear bracket are formed as stepped portions. Inner interfaces 8 and 9 between the front bracket 2 and the rear bracket 3 and between the part chamber 6 and the peripheral cooling chamber 7 are situated at a location corresponding to a stator 111. Reference numeral 12 denotes a sealing member such as an O ring arranged between the interfaces 8 and 9, and 13 a sealing member such as an O ring arranged between the interfaces 10 and 11. The sealing members 12 and 13 prevent a cooling liquid 14 shown by dotted lines from leaking from the peripheral cooling chamber 7 through the interfaces 8 to 11. Denoted by 15 and 16 are cooling fins which are provided on the side surface of the peripheral cooling chamber formed in the front bracket 2 and the rear bracket 3, spaced apart from a generator shaft 61 with a predetermined interval therebetween in a direction parallel to the generator shaft 61 and shaped like a plurality of rings extending in the circumferential directions of the front bracket 2 and the rear bracket 3, respectively. The cooling fins 15 are molded out of the same material as that of the front bracket 2 together with the front bracket 2 so that they are integrated with the front bracket 2. The cooling fins 16 are molded out of the same material as that of the rear bracket 3 together with the rear bracket 3 so that they are integrated with the rear bracket 3. The front bracket 2, the rear bracket 3 and the cooling fins 15 and 16 are made from a metal having high heat conductivity such as aluminum.

Denoted by 18 is a cooling cover placed upon the rear side of the rear bracket 3, which is attached to a ring-shaped rear flange portion 19 formed on the rear of the rear bracket 3 by a bolt 20 made from a material having high heat conductivity such as aluminum to form an airtight rear cooling chamber 21 between the rear bracket 3 and the cooling cover 18. Reference numeral 22 is a sealing member such as an O ring fitted in the interface between the rear flange portion 19 and the cooling cover 18 to prevent the cooling liquid 14 in the rear cooling chamber 21 from leaking from the interface.

Reference numeral 23 represents cooling fins provided on the rear cooling chamber side of the rear bracket 3 at a location corresponding to the voltage regulator 132, and 24 cooling fins provided on the cooling chamber side of the rear bracket 3 at a location corresponding to the rectifier 134. These cooling fins 23 and 24 are molded out of the same material as that of the rear bracket together with the rear bracket 3 so that they are integrated with the rear bracket 3. These cooling fins 23 and 24 may be formed like rings located on a plurality of circles having different radii with the generator shaft 61 as a center. However, when they are formed at locations corresponding to the voltage regulator 132 and the rectifier 142, the voltage regulator 132 and the rectifier 134 are cooled with the cooling liquid 14 smoothly. The rear bracket 3 and the cooling fins 23 and 24 are made from a metal having high heat conductivity such as aluminum.

Reference numeral 25 indicates a communication hole formed in the rear bracket 3 for connecting the rear cooling chamber to the peripheral cooling chamber 7, 26 an inflow port which is formed in the rear flange portion 19 so that it communicates with the rear cooling chamber 21 and is attached to the rear bracket 3 by fastening a threaded portion formed on the peripheral surface of the base portion of the inflow port 26 to a screw hole formed in the rear flange portion 19, and 27 an outflow port which is formed in the peripheral wall of the front bracket 2 so that it communicates with the peripheral cooling chamber 7 and is attached to the front bracket 2 by fastening a threaded portion formed on the peripheral surface of the base portion of the outflow port 27 to a screw hole formed in the peripheral wall of the front bracket 2. The cooling liquid 14 is introduced from the inflow port 26 to the rear cooling chamber 21 as shown by an arrow X1. Thereafter, the cooling liquid 14 flows into the peripheral cooling chamber 7 from the rear cooling chamber 21 through the communication hole 25. Then, the cooling liquid 14 is discharged through the outflow port 27 from the peripheral cooling chamber 7 as shown by an arrow X2.

Denoted by 28 is an electric insulating material having high heat conductivity such as a silicone resin which is charged into a gap surrounded by the front bracket 2, the rear bracket 3 and the stator 111 from a filling port 29 formed in the front bracket 2 and solidified. Thereby, the stator 111 fixed to the front bracket 2 and the rear bracket 3 is more firmly supported. The electric insulating material 28 may not be charged from the filling port 29 and solidified.

In Embodiment 1, such elements as the stator 111, front bearing 115, rear bearing 116, pulley 117, voltage regulator 132 and rectifier 134 are the same as those of the prior art, but the following (a) to (k) differ from the prior art, in addition to the above characteristic structures.

(a) The stator 111 is installed on the inner wall of the rear bracket 3 in the part chamber 6.
(b) A rotor 31 comprises rotary magnetic poles 32 pressed fitted onto the generator shaft 61 and a field coil 33 fitted in the rotary magnetic poles 32.
(c) The rotary magnetic poles 32 have an air hole 34 communicating with the front side and the rear side and a fan 35 fixed to the rear side thereof.
(d) The front bracket 2 has a plurality of front air holes 2a communicating with the part chamber 6 and the outside of the generator case 1 in the front surface at locations where they do not interfere with the filling port 29 and the front bearing 115. The front air holes 2a are spaced apart from one another in a circumferential direction of a circle whose center is located at the generator shaft 61 and are situated at a location corresponding to the peripheral portions of the front surfaces of the rotary magnetic poles 32.
(e) The rear bracket 3 has a rear air hole 3a communicating with the part chamber 6 and the outside of the generator case 1 in the peripheral wall at a location where it does not interfere with the cooling recessed portion 5 and the communication hole 25. The rear air hole 3a is situated at a location corresponding to the peripheral portion of the fan 35. In FIG. 1, only one rear air hole 3a is illustrated but a plurality of rear air holes 3a may be formed like the front air holes 2a.
(f) The generator shaft 61 has a shaft air hole 61a communicating with the part chamber 6 and the outside of the power case 1 in the center. The shaft air hole 61a is formed like a front-open bottomed cylinder from the front end to the intermediate portion of the generator shaft 61 and is open to the peripheral surface from near the bottom portion of the cylinder.
(g) The field coil 33 is wired to a plurality of slip rings 37 and 38 of a slinger portion 36 press fitted onto the generator shaft 61 between the rotor 31 and the rear bearing 116, and a plurality of brushes 40 and 41 of a brush holder portion 39 attached to the rear bracket 3 are contacted to the slip rings 37 and 38 by brush springs 42 and 43, respectively.
(h) The voltage regulator 132 is attached to the part chamber side of the rear bracket 3 with a plate-like heat sink 44 made from a metal having high heat conductivity such as aluminum and a plate-like heat conductor 45 made from a synthetic resin having high heat conductivity such as a silicone resin interposed therebetween and placed one upon the other.
(i) The rectifier 134 is attached to the part chamber side of the rear bracket 3 with a plate-like heat sink 46 made from a metal having high heat conductivity such as aluminum and a plate-like heat conductor 47 made from a synthetic resin having high heat conductivity such as a silicone resin interposed therebetween and placed one upon the other.
(j) Denoted by 48 is a spacer fitted onto the generator shaft 61 between the front bearing 115 and the rotary magnetic poles 32.
(k) Denoted by 49 is a ring-shaped bearing stopper having a larger inner diameter than the spacer 48 and attached to the part chamber 6 side of the front bracket 2 by a bolt 50 to limit the movement of the front bearing 115 toward the part chamber 6.

When the car AC generator with a brush of Embodiment 1 is used in an automobile, the power generation of the car AC generator is the same as that of the car AC generator with a brush of the prior art. That is, the car AC generator is installed outside the cylinder block of an engine, a ring-shaped belt is laid between a pulley provided on the crank shaft of the engine and the pulley 118 of the AC generator, and a car battery is wired to an unshown external terminal. When a driver turns on the ignition switch of the automobile in this state, a current runs from the battery of the automobile to an ignition coil to start the engine, an excitation current runs from the battery to the field coil 33 through the brushes 40 and 41 and the slip rings 37 and 38, and the rotary magnetic poles 32 and the stator magnetic pole 112 form a magnetic circuit. The generator shaft 61 turns by the start of the engine, the rotor 31 also turns, and the rotary magnetic poles 32 pass by the stator magnetic pole 112 alternately, whereby an alternating magnetic flux runs through the stator coil 113, and 3-phase AC induced electromotive force is generated in the stator coil 113. This induced electromotive force is adjusted by the voltage regulator 132, rectified by the rectifier 134 and charged into the battery from the external terminal 137 through an unshown wire. In FIG. 2, reference numeral 51 denotes a tank for storing the cooling liquid 14, 52 a pump for supplying the cooling liquid 14 stored in the tank 51, 53 the discharge port of the pump 52, 54 a pipe for connecting the discharge port 53 to the inflow port 26 of the rear cooling chamber 21, 55 a pipe for connecting the outflow port 27 of the peripheral cooling chamber 7 to the inlet port 57 of a radiator 56, and 59 a pipe for connecting the outlet port 58 of the radiator 56 to the return port 60 of the tank 51. Therefore, when the pump 52 is driven by a motor driven with power from the battery of the automobile or drive means driven by the engine through a belt while the cooling liquid 14 is stored in the tank 51, the cooling liquid 14 returns from the tank 51 through the pump 52, discharge port 53, pipe 54, inflow port 26, rear cooling chamber 21, communication hole 25, peripheral cooling chamber 7, outflow port 27, pipe 55, inlet port 57, radiator 56, outlet port 58, pipe 59 and return port 60 to the tank 51. In the course of circulating the cooling liquid 14, the cooling liquid 14 absorbs heat generated from such parts as the voltage regulator 132 and the rectifier 134 by the operation of power generation through heat exchange in the rear cooling chamber 21. Thereafter, in the peripheral cooling chamber 7, the cooling liquid 14 absorbs heat generated from such parts as the stator 111, the rotary magnetic poles 32 and the field coil 33 by the operation of power generation through heat exchange. The warmed cooling liquid 14 radiates heat through heat exchange with the radiator 56 and is cooled.

According to the constitution of Embodiment 1, since the peripheral cooling chamber 7 is formed apart from the part chamber 6 in the peripheral portion of the generator case 1 by two separate parts, the front bracket 2 having the ring-shaped cooling recessed portion 4 and the rear bracket 3 having the ring-shaped cooling recessed portion 5, the structure of the peripheral cooling chamber 7 is simple. Since the rear cooling chamber 21 is formed apart from the part chamber 6 at the rear of the generator case 1 by two separate parts, the rear bracket 3 and the cooling cover 18, the structure of the rear cooling chamber 21 is simple. Since the rotary magnetic poles 32 have the fan 35, the front bracket 2 has the front air holes 2a, the rear bracket 3 has the rear air hole 3a, and the generator shaft 61 has the shaft air hole 61a, the fan 35 can introduce the outside air from the outside of the generator case 1 into the inside of the part chamber 6 and can exhaust the inside air of the part chamber 6 to the outside of the generator case 1 during the rotation of the rotor 31. According to the direction and rotation direction of the blade of the fan 35, for example, the outside air is introduced into the part chamber 6 from the front air holes 2a and the shaft air hole 61a as shown by arrows Y1 and Y2 and the inside air is exhausted to the outside of the generator case 1 through the rear air hole 3a as shown by an arrow Y3. In the course of circulating cooling air shown by Y1 to Y3 generated by the introduction of the outside air and the exhaust of the inside air in the inside of the part chamber 6, power generation parts such as the rotor 31, the stator 111, the voltage regulator 132 and the rectifier 134 arranged in the inside of the part chamber 6 can be cooled with cooling air efficiently. Therefore, cooling function portions with the cooling liquid 14 and cooling air shown by Y1 to Y3 can be formed simple in structure.

According to the constitution of Embodiment 1, since the front side of the cooling recessed portion 4 is open and the rear side of the cooling recessed portion 5 is open, when the cooling recessed portion 4 is formed in the front bracket 2 by molding the front bracket 2 and even when the cooling recessed portion 5 is formed in the rear bracket 3 by molding the rear bracket 3, the front bracket 2 and the rear bracket 3 can be easily removed from their molds.

Since the cooling cover 13 is placed upon the rear bracket 3 by the bolt 20 made from a material having high heat conductivity, heat is conducted between the rear bracket 3 and the cooling cover 18 smoothly and the cooling function of the cooling liquid is further improved.

According to the constitution of Embodiment 1, since the generator case 1 is made from a material having high heat conductivity, heat generated from such parts as the stator 111 and the rotor 31 stored in the inside of the part chamber 6 is radiated to the cooling liquid 14 in the peripheral cooling chamber 7 through the generator case 1 and the cooling function of the cooling liquid 14 flowing in the inside of the peripheral cooling chamber 7 can be improved.

According to the constitution of Embodiment 1, since the rear bracket 3 is made from a material having high heat conductivity, heat generated from such parts as the voltage regulator 132 and the rectifier 134 installed on the rear bracket 3 can be radiated to the cooling liquid 14 flowing in the inside of the rear cooling chamber 21 through the rear bracket efficiently.

According to the constitution of Embodiment 1, since the shaft air hole 61a is situated in the center portion of the generator shaft 61, mass balance against the rotation of the generator shaft 61 is good and the generator shaft 61 can turn smoothly. Since the shaft air hole 61a is formed so that the outside air introduced from the front end is exhausted from the rear surfaces of the rotary magnetic poles 32, power generation parts in the inside of the part chamber 6 can be cooled more efficiently.

According to the constitution of Embodiment 1, since the rotary magnetic poles 32 have the air hole 34, the air introduced into the part chamber 6 from the air holes 2a flows into the rear side of the rotor 31 through the air hole 34 from the front side of the rotor 31 so that it can cool power generation parts inside the part chamber 6 more efficiently.

According to the constitution of Embodiment 1, since the stator 111 is supported by the front bracket 2 and the rear bracket 3 through the electric insulating material 28 having high heat conductivity, heat generated from the stator 111 can be radiated to the peripheral cooling chamber 7 through the front bracket 2 and the rear bracket 3 efficiently.

According to the constitution of Embodiment 1, since the cooling fins 15 and 16 are formed in the cooling recessed portion 4 of the front bracket 2 and the cooling recessed portion 5 of the rear bracket 3, respectively, heat generated from the stator 111 can be radiated to the cooling liquid 14 running in the inside of the peripheral cooling chamber 7 through the front bracket 2, the rear bracket 3 and the cooling fins 15 and 16 efficiently.

According to the constitution of Embodiment 1, since the cooling fins 15 and 16 are shaped like rings extending in the circumferential directions of the front bracket 2 and the rear bracket 3, the cooling fins 15 and 16 serve as a guide for forming a flow of the cooling liquid 14 from the communication hole 25 to the outflow port 27 so that the cooling liquid 14 flows from the communication hole 25 of the peripheral cooling chamber 7 to the outflow port 27 smoothly, thereby improving heat exchange with the cooling liquid 14.

According to the constitution of Embodiment 1, since the cooling fins 23 are provided at a location corresponding to the voltage regulator 132 and the cooling fins 24 are provided at a location corresponding to the rectifier 134 and both the cooling fins 23 and 24 are provided on the rear cooling chamber side of the rear bracket 3, heat generated from the voltage regulator 132 and heat generated from the rectifier 134 can be radiated to the cooling liquid 14 running in the inside of the rear cooling chamber 21 through rear bracket 3 and the cooling fins 23 and 24 efficiently.

According to the constitution of Embodiment 1, since the voltage regulator 132 is attached to the rear bracket 3 through the heat sink 44 and the heat conductor 45 having high heat conductivity and placed one upon the other, heat generated from the voltage regulator 132 can be transmitted to the rear bracket 3 efficiently.

According to the constitution of Embodiment 1, since the rectifier 134 is attached to the rear bracket 3 through the heat sink 46 having high heat conductivity and the heat conductor 47 having high heat conductivity and placed one upon the other, heat generated from the rectifier 134 can be transmitted to the rear bracket 3 efficiently.

According to the constitution of Embodiment 1, since the interfaces 8, 9, 10 and 11 between the front bracket 2 and the rear bracket 3 are formed as stepped portions, the front bracket 2 and the rear bracket 3 can be easily removed from their molds.

According to the constitution of Embodiment 1, since the interfaces 8 and 9 between the front bracket 2 and the rear bracket 3 and between the part chamber 6 and the peripheral cooling chamber 7 are situated at a location corresponding to the stator 111, the stator 111 serves as a sealing member for preventing the cooling liquid 14 from leaking from the peripheral cooling chamber 7, thereby improving the water-proof performance of the peripheral cooling chamber 7.

According to the constitution of Embodiment 1, since a cooling system comprising at least the tank 51 and the radiator 56 is connected to the cooling chambers 7 and 21 independently of the engine cooling system of the automobile as shown in FIG. 2, the cooling of the generator and the cooling of the engine are independent of each other, thereby making it possible to cool both the generator and the engine properly.

Embodiment 2

In Embodiment 1, the fan 35 is provided at the rear of the rotor 31. However, an unshown fan similar to the fan 35 may be provided at the front of the rotor 31 in addition to the fan 35.

Embodiment 3

In Embodiments 1 and 2, a car AC generator with a brush is used. The present invention can also be applied to a brushless car AC generator when a power generation part equivalent to the rotor 31 comprises a rotary magnetic pole fixed to the generator shaft 61 and an exciter fixed to the rear bracket 3 by an attachment tool made from a material having high heat conductivity.

In Embodiment 1, the cooling liquid flows from the rear cooling chamber 21 to the peripheral cooling chamber 7. The cooling liquid may be caused to flow from the peripheral cooling chamber 7 to the rear cooling chamber 21 by exchanging the inflow port 26 with the outflow port 27. In this case, the cooling liquid cools power generation parts having a large heating value such as the stator 111 and the rotor 31 or the rotary magnetic pole 118 and the exciter 122 first and then power generation parts having a small heating value such as the voltage regulator 132 and the rectifier 134. Therefore, the flow rate of the cooling liquid must be increased. Compared with this, when the cooling liquid is caused to flow from the rear cooling chamber 21 to the peripheral cooling chamber 7 as in Embodiments 1 to 3, the cooling liquid cools power generation parts having a small heating value such as the voltage regulator 132 and the rectifier 134 first and then power generation parts having a large heating value such as the stator 111 and the rotor 31 or the rotary magnetic pole 118 and the exciter 122, thereby making it possible to further improve the cooling efficiency of the cooling liquid without increasing the flow rate of the cooling liquid. When the generator shaft 61 has a heat pipe built-in structure or a heat pipe structure, heat generated from the rotor 31 and the rotary magnetic pole 118 can be radiated through the generator shaft 61 efficiently, thereby making it possible to improve the cooling performance of the rotor 31 and the rotary magnetic pole 118.

Embodiment 4

In Embodiment 1, the outside air is introduced into the part chamber 6 through the front air holes 2a and the shaft air hole 61a. The outside air may be introduced into the part chamber 6 by forming either one of them.

Embodiment 5

In Embodiment 1, the air hole 34 is formed in the rotary magnetic poles 32 at the interface between the rotary magnetic poles 32 and the generator shaft 61. The air hole 34 may be formed in the rotary magnetic poles 32 apart from the generator shaft 61 or in the generator shaft 61 at the interface between the rotary magnetic poles 32 and the generator shaft 61. When the air hole 34 is formed in the generator shaft 61, a plurality of the air holes 34 are formed in a circumferential direction of the generator shaft 61 at equal intervals in consideration of mass balance against the rotation of the generator shaft 61 so that the generator shaft 61 can turn smoothly.

Embodiment 6

In Embodiment 1, the filling port 29 is formed in the front bracket 2. The filling port 29 may be formed in both the front bracket 2 and the rear bracket 3, or in the rear bracket 3.

As having been described above, according to the first aspect of the present invention, the front bracket and the rear bracket are combined together to form the part chamber having air holes and the peripheral cooling chamber, and the cooling cover is placed upon the rear bracket to form the rear cooling chamber connected to the peripheral cooling chamber by the communication hole. Therefore, the peripheral cooling chamber can be formed by two parts, the front bracket and the rear bracket, and the rear cooling chamber can be formed by two parts, the rear bracket and the cooling cover. Since a power generation part has a fan, the air can be circulated between the part chamber and the outside by the rotation of the fan during the operation of power generation, and cooling function portions with the cooling liquid and cooling air can be formed simple in structure.

According to the second aspect of the present invention, since the peripheral cooling chamber is formed by the cooling recessed portion of the front bracket and the cooling recessed portion of the rear bracket and the interfaces between the front bracket and the rear bracket are situated at a location corresponding to the stator, the stator can improve the water-proof performance of the peripheral cooling chamber.

According to the third aspect of the present invention, since the interfaces between the front bracket and the rear bracket are formed as stepped portions, the front bracket and the rear bracket can be easily formed.

According to the fourth aspect of the present invention, since at least one of the rotor and the generator shaft has an air hole, cooling air circulates in the inside of the rotor or the generator shaft by the rotation of the fan, thereby making it possible to cool power generation parts stored in the part chamber efficiently.

According to the fifth aspect of the present invention, since the front bracket, the rear bracket and the cooling cover are made from a material having high heat conductivity, heat generated from power generation parts stored in the part chamber is transmitted from the part chamber through the material having high heat conductivity to the outside efficiently, the power generation parts are cooled properly, and the service lives of the power generation parts are extended.

According to the sixth aspect of the present invention, since the stator is supported by the brackets forming the part chamber through the electric insulating material having high heat conductivity, heat generated from the stator can be transmitted to the cooling liquid in the cooling chamber through the electric insulating material and the brackets efficiently.

According to the seventh aspect of the present invention, since the electric insulating material having high heat conductivity is charged into a gap between the stator and the part chamber and solidified, the electric insulating material spreads to every corner of the gap and can transmit heat generated from the stator to the brackets efficiently compared with a case where a solid electric insulating material is inserted into the gap between the stator and the part chamber.

According to the eighth aspect of the present invention, since the electric insulating material having high heat conductivity can be charged into the gap between the part chamber and the stator from the filling port formed in at least one of the front bracket and the rear bracket and solidified, the operation of charging the electric insulating material can be carried out easily and the solidified electric insulating material can transmit heat generated from the stator to the brackets efficiently.

According to the ninth aspect of the present invention, since the voltage regulator is attached to the part chamber side of the rear bracket through cushions having high heat conductivity, heat generated from the voltage regulator is radiated to the cooling liquid in the rear cooling chamber through the cushions and the rear bracket efficiently.

According to the tenth aspect of the present invention, since the rectifier is attached to the part chamber side of the rear bracket through cushions having high heat conductivity, heat generated from the rectifier is radiated to the cooling liquid in the rear cooling chamber through the cushions and the rear bracket efficiently.

According to the eleventh aspect of the present invention, since cooling fins are provided on the side surfaces of the cooling chambers of the brackets forming the part chamber, the efficiency of heat exchange between the brackets and the cooling liquid is improved.

According to the twelfth aspect of the present invention, the cooling fins are formed like rings extending in the circumferential direction of the peripheral cooling chamber, the cooling fins guide a flow of the cooling liquid in a predetermined direction, thereby improving the heat exchange of the cooling liquid.

According to the thirteenth aspect of the present invention, since the cooling fins are provided at a location corresponding the rectifier attached to the rear bracket, heat generated from the rectifier can be radiated to the cooling liquid in the rear cooling chamber through the rear bracket and the cooling fins efficiently.

According to the fourteenth aspect of the present invention, since the cooling fins are provided at a location corresponding to the voltage regulator attached to the rear bracket, heat generated from the voltage regulator can be radiated to the cooling liquid in the rear cooling chamber through the rear bracket and the cooling fins efficiently.

According to the fifteenth aspect of the present invention, since the inflow port of the cooling liquid is formed in the rear cooling chamber and the outflow port of the cooling liquid is formed in the peripheral cooling chamber, the cooling liquid cools power generation parts having a small heaving value first and then power generation parts having a large heating value, thereby making it possible to further improve the cooling efficiency of the cooling liquid.

According to the sixteenth aspect of the present invention, since a cooling system having at least a tank and a radiator is connected to the cooling chambers independently of the engine cooling system of the vehicle, the cooling of the generator and the cooling of the engine are independent of each other, thereby making it possible to cool the generator and the engine properly. Since the cooling system of the power generator has at least a tank and a radiator, the cooling liquid is supplied from the tank. When the AC generator is mounted on an automobile, it is possible to install the tank at the best position for supplying the cooling liquid and the radiator at the best position for heat radiation in the narrow engine room of the automobile together with auto parts other than the generator.

What is claimed is:

1. An AC generator having a cooling function with a cooling liquid and cooling air, wherein:
   at least one of a front bracket and a rear bracket has a ring-shaped cooling recessed portion in a peripheral portion, the front bracket and the rear bracket are combined together to form a part chamber for storing power generation parts including a generator shaft, a stator and a rotor, the ring-shaped cooling recesses portion forms a ring-shaped peripheral cooling chamber, a cooling cover is disposed on a rear portion of the rear bracket to form a rear cooling chamber with the rear bracket, the rear bracket has a communication hole for connecting the ring-shaped peripheral cooling chamber to the rear cooling chamber, at least one of the front bracket and the rear bracket has air holes communicating with the part chamber and the outside, and a power generation part has a fan.

2. The AC generator according to claim 1, wherein the ring-shaped cooling recessed portion is formed in both the front bracket and the rear bracket, and interfaces between the front bracket and the rear bracket are situated at a location corresponding to the stator.

3. The AC generator according to claim 1, wherein interfaces between the front bracket and the rear bracket are formed as ring-shaped stepped portions.

4. The AC generator according to claim 1, wherein at least one of the rotor and the generator shaft has an air hole.

5. The AC generator according to claim 1, wherein the front bracket, the rear bracket and the cooling cover are made from a metallic material having high heat conductivity.

6. The AC generator according to claim 1, wherein the stator is supported by the brackets forming the part chamber through an electric insulating material having high heat conductivity.

7. The AC generator according to claim 6, wherein the electric insulating material is charged into a gap between the stator and the part chamber and solidified.

8. The AC generator according to claim 1, wherein at least one of the front bracket and the rear bracket has a filling port for charging and solidifying an electric insulating material.

9. The AC generator according to claim 1, wherein a voltage regulator is attached to the part chamber side of the rear bracket through cushions having high heat conductivity.

10. The AC generator according to claim 1, wherein a rectifier is attached to the part chamber side of the rear bracket through cushions having high heat conductivity.

11. The AC generator according to claim 1, wherein cooling fins are provided on side surfaces of the ring-shaped peripheral cooling chamber.

12. The AC generator according to claim 11, wherein the cooling fins are ring-shaped and extend in the circumferential direction of the ring-shaped peripheral cooling chamber.

13. The AC generator according to claim 11, wherein the cooling fins are provided at a location corresponding to the rectifier attached to the rear bracket.

14. The AC generator according to claim 11, wherein the cooling fins are provided at a location corresponding to the voltage regulator attached to the rear bracket.

15. The AC generator according to claim 1, wherein an inflow port for introducing a cooling liquid is formed in the rear cooling chamber and an outflow port for discharging the cooling liquid is formed in the peripheral cooling chamber.

16. The AC generator according to claim 1, wherein a cooling system having at least a tank and a radiator is connected to the cooling chambers independently of the engine cooling system of a vehicle.

* * * * *